(12) United States Patent
Saeed et al.

(10) Patent No.: US 11,907,550 B2
(45) Date of Patent: Feb. 20, 2024

(54) METHOD FOR DYNAMICALLY ASSIGNING MEMORY BANDWIDTH

(71) Applicant: Robert Bosch GmbH, Stuttgart (DE)

(72) Inventors: Ahsan Saeed, Stuttgart (DE); Dakshina Narahari Dasari, Boeblingen (DE); Falk Rehm, Renningen (DE); Michael Pressler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 13 days.

(21) Appl. No.: 17/456,140

(22) Filed: Nov. 22, 2021

(65) Prior Publication Data
US 2022/0171549 A1    Jun. 2, 2022

(30) Foreign Application Priority Data
Nov. 27, 2020   (DE) .......................... 102020214951.8

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC .. G06F 13/14; G06F 13/1652; G06F 13/1663; G06F 13/1668; G06F 13/4027
See application file for complete search history.

(56) References Cited

U.S. PATENT DOCUMENTS

| | | | |
|---|---|---|---|
| 2013/0198478 A1* | 8/2013 | Bitner | G06F 9/5016 711/170 |
| 2014/0040576 A1* | 2/2014 | Cordero | G06F 12/0646 711/E12.103 |
| 2017/0337002 A1* | 11/2017 | Davis | G06F 3/0653 |
| 2019/0042408 A1* | 2/2019 | Schmisseur | H04L 45/28 |
| 2020/0065150 A1* | 2/2020 | Wang | G06F 3/067 |
| 2023/0067749 A1* | 3/2023 | Srinivasan | G06F 3/0655 |

OTHER PUBLICATIONS

H. Yun, W. Ali, S. Gondi and S. Biswas, "BWLOCK: A Dynamic Memory Access Control Framework for Soft Real-Time Applications on Multicore Platforms," in IEEE Transactions on Computers, vol. 66, No. 7, pp. 1247-1252, Jul. 1, 2017, doi: 10.1109/TC.2016.2640961. (Year: 2017).*

(Continued)

*Primary Examiner* — Khoa D Doan
(74) *Attorney, Agent, or Firm* — NORTON ROSE FULBRIGHT US LLP; Gerard A. Messina

(57) ABSTRACT

A method for dynamically assigning memory bandwidth to multiple processor units, which are connected via a data connection to a shared memory unit. In an initialization phase, each of the multiple processor units are assigned an initial value of a usable memory bandwidth, and a permissible range for a mean usage of the memory bandwidth is determined. Subsequently, the assigned memory bandwidths are checked repeatedly and adjusted if needed, a present value of a mean usage of the memory bandwidth by the multiple processor units being determined, and, if this present value is outside the permissible range, the values of the usable memory bandwidth are adjusted for at least a part of the multiple processor units.

11 Claims, 2 Drawing Sheets

(56) References Cited

OTHER PUBLICATIONS

F. Farshchi, Q. Huang and H. Yun, "BRU: Bandwidth Regulation Unit for Real-Time Multicore Processors," 2020 IEEE Real-Time and Embedded Technology and Applications Symposium (RTAS), Sydney, NSW, Australia, 2020, pp. 364-375, doi: 10.1109/RTAS48715.2020.00011. (Year: 2020).*

Marco Caccamo, Rodolfo Pellizzoni, Lui Sha, Gang Yao, and Heechul Yun. 2013. MemGuard: Memory bandwidth reservation system for efficient performance isolation in multi-core platforms. In Proceedings of the 2013 IEEE 19th Real-Time and Embedded Technology and Applications Symposium (RTAS) (RTAS '13). IEEE Computer Society, Washington, DC, USA, Retreived from the Internet on Nov. 22, 2021: http://www.ittc.ku.edu/~heechul/papers/memguard-rtas13.pdf. 10 Pages.

* cited by examiner

METHOD FOR DYNAMICALLY ASSIGNING MEMORY BANDWIDTH

FIELD

The present invention relates to a method for dynamically assigning memory bandwidth to multiple processor units which are connected via a data connection to a shared memory unit, and a processing unit and a computer program for carrying out the method.

BACKGROUND INFORMATION

Applications in vehicles which relate, for example, to autonomous or automated driving may be very computationally-intensive and data-intensive. There is accordingly a trend toward the use of high-performance computer platforms in cyber-physical systems (for example, by outsourcing into vehicle-external processing systems ("cloud")). There are typically different resources on such platforms such as CPU clusters, GPUs, or other user-defined hardware accelerators (also referred to as a memory master or master hereinafter), which all access the same jointly used memory (slave) via a connection. In this case, an application which is executed on a certain core (this is to be understood in particular as one of multiple processor cores of the CPU or the CPU cluster) initially competes with applications on other cores for the memory. Moreover, other masters such as the GPU may compete with the CPU for the jointly used memory via the jointly used connection.

It has been shown that an application may suffer a significant lengthening of the execution time due to an access to jointly used resources such as the main memory when it is executed together with other applications on a shared multicore platform. This competition with other masters makes the problem even more severe. It is therefore desirable not to permit a master to monopolize the access to the memory via the connection, and instead to regulate the access. This also applies to the memory usage of each core within a CPU cluster.

SUMMARY

According to the present invention, a method for dynamically assigning memory bandwidth and a processing unit and a computer program for carrying out the method are provided. Advantageous example embodiments of the present invention are disclosed herein.

The present invention relates to the dynamic assignment of memory bandwidth to multiple processor units which are connected via a data connection, for example, a bus, to a shared memory unit, in particular a shared working memory, i.e., a volatile memory, for example, DRAM (dynamic random access memory). The memory unit or the memory has a bandwidth or a memory bandwidth in this case, thus a rate of data which may be read and/or written per unit of time. This bandwidth is not necessarily constant. A DRAM has, for example, independent internal optimization mechanisms (compare to caches, for example), so that depending on the access sequence to memory addresses, this bandwidth may be higher or lower. Independently thereof, the processor units have to share the available bandwidth. Processor units are to be understood as both individual processor cores, for example, a CPU ("central processing unit") and also GPU ("graphics processing unit") or DMA ("direct memory access"). These processor units may be used in a control unit or another data processing system, for example, in a vehicle, as already mentioned at the outset. However, applications in control systems, in particular industrial control systems, also come into consideration.

A mechanism or a method is described in Marco Caccamo, Rodolfo Pellizzoni, Lui Sha, Gang Yao, and Heechul Yun, 2013, "MemGuard: Memory bandwidth reservation system for efficient performance isolation in multi-core platforms," in Proceedings of the 2013 IEEE 19th Real-Time and Embedded Technology and Applications Symposium (RTAS) (RTAS '13). IEEE Computer Society, Washington, DC, USA, 55-64., in which a minimal memory bandwidth is guaranteed for various CPU cores within a CPU cluster. This functions in that a core is assigned a budget, thus a certain value or portion for the use of the total available memory bandwidth and in that cache errors of the last level are supervised in a regulating interval and the core is stopped if the budget is exceeded within a regulating interval. In addition, this method offers an option of dynamically assigning the memory bandwidth based on the prior usage profile. However, the prediction always observes the prior intervals and is not event-controlled. A static assignment of budgets to each core is assumed and the unused budget is then redistributed.

Another option for memory-conscious planning is to establish the tasks which are to be carried out jointly at a certain point in time on various cores beforehand, for example, by way of a planner, so that the memory limits may not be expanded. The application may also be ordered in memory and processing phases, and the various memory phases of applications on various cores may be planned. However, an approach is desirable which is independent of the planning logic and does not change the application behavior.

On the hardware side, embedded high-performance platforms increasingly offer, for example, QoS modules for the connection between masters (e.g., CPU, GPU, DMA) and the main memory. "QoS" stands for "Quality of Service" and is a measure of how strongly the quality of a service corresponds to the requirements. These QoS modules help in the regulation of the data traffic based on various parameters such as outstanding transactions, rate regulation, or latency-based regulation. For example, the registers on the connection may be configured in such a way that a limit is established for the outstanding transactions, for example for the GPU, so that the connection is not inundated with memory transactions. The connection then throttles the incoming data traffic from the GPU as soon as the limit is exceeded, so that other masters may access the memory. Such modules are typically programmable via registers and control the main components connected to the connection.

However, such QoS modules have disadvantages. On the one hand, the QoS module treats the entire cluster of cores as a single master, since the entire cluster is connected at a single port or a single interface to the connection. The QoS module therefore possibly only offers a regulation on the level of the cluster and possibly may not differentiate between different cores, which does not solve the problem of a core-spanning competition. On the other hand, a static configuration of the regulating parameters is possibly not sufficient to efficiently use the shared memory. Therefore, a software mechanism is additionally provided, which takes into consideration changing memory usage patterns of applications and may reconfigure these regulation parameters in the QoS modules.

An example embodiment of the present invention provides an option of furthermore dynamically regulating the memory bandwidth for various masters—these may be both individual processor units and groups thereof (or of cores)—on the connection level and in addition regulating the memory bandwidth between the cores within a group of processor units, thus within a master.

For this purpose, an example embodiment of the present invention provides that in an initialization phase, an initial value of a usable memory bandwidth is assigned to each of the multiple processor units, and a permissible range for a mean usage of the memory bandwidth is determined. The permissible range may be established, for example, by a lower limiting value and an upper limiting value for the usage of the memory bandwidth. A maximum possible utilization minus absolutely required capacities for real-time processor units (this will be described in more detail hereinafter) may be selected, for example, for the upper limiting value. For the lower limiting value, for example, a minimum of the values for the upper limiting value and an average utilization of the non-real-time processor units may be selected. These limiting values may be varied depending on the situation. Moreover, at least one quality parameter is preferably predefined, for example, for a QoS module for at least one of the multiple processor units in the initialization phase. The initialization phase advantageously takes place prior to the regular operation of the overall system (including processor units and memory units). If the initialization phase makes use of allocation mechanisms which are based on supervising the memory accesses during operation, the duration of such an initialization phase may be preconfigured, for example.

The specification or determination of these initial values of the usable memory bandwidth—thus a type of budget—may take place, for example, in that such processor units which are used for real-time calculations are each assigned a maximum required value, in particular including an additional buffer, as the initial value of the usable memory bandwidth. For this purpose, a type of calibration may take place within the scope of the initialization phase, during which the processor units are separately operated and their required memory bandwidth is determined—thus a type of memory access profile. It may be advantageous that a memory profile creation is carried out for the worst case for real-time processor units (so-called real-time core, RTC), in that it is executed together with memory-intensive benchmarks on other processor units. In this way, such processor units are ultimately to always have the required memory bandwidth available to be able to operate in real time. It is to be mentioned at this point that a real-time processor unit is to be understood as a processor unit which is used (in particular only) for real-time calculations; its hardware may be identical to that of other processor units, however.

Processor units which are not used for real-time calculations, in contrast, may each be assigned a mean required value as the initial value of the usable memory bandwidth. This mean required value may also be determined using the mentioned type of the calibration, during which the processor units are operated separately and their required memory bandwidth is determined. However, it is also possible to assign these initial values in another way, for example, by empirical values.

It would also be possible to use runtime parameters such as deadlines or the difference (laxity) between deadline and response time to determine initial values, and possibly also to check whether assigned values are sufficient. Deadlines play a role in real-time processing, a differentiation being made between hard deadlines, i.e., results after the deadline are useless, and soft deadlines, i.e., the quality decreases after the deadline. The initial values may be updated repeatedly during the initialization phase, for example, specifically until the number of the missed deadlines for all processor units is below a predetermined threshold value.

Subsequently, i.e., after the end of the initialization phase and therefore in particular during operation of the system including the processor units and the memory unit, the assigned memory bandwidths are checked repeatedly and adjusted if needed. This may take place, for example, within the context of supervision and regulating phases alternating with one another. For this purpose, a present value of a mean usage of the memory bandwidth by the multiple processor units—thus a mean memory utilization—is determined and, if this present value is outside the permissible range, the values of the usable memory bandwidth are adapted for at least a part of the multiple processor units. This may thus be referred to as a regulating phase. This part of the multiple processor units (thus those processor units for which the values of the usable memory bandwidth are adjusted) includes in particular processor units which are not used for a real-time calculation. In the case of processor units which are used for a real-time calculation, in contrast, an adjustment may be omitted, so that real-time applications may still be executed reliably.

If the mean value falls below the lower limiting value, the values of the usable memory bandwidth may be increased. If the mean value exceeds the upper limiting value, the values of the usable memory bandwidth may be reduced, in contrast. The memory bandwidth may thus be dynamically adjusted and utilized as efficiently as possible.

As mentioned above, this procedure is in particular also applicable and preferred if at least two of the multiple processor units are part of a processor unit group and are connected via a shared interface to the data connection. This processor unit group thus forms an above-mentioned master, for example, a CPU or a CPU cluster including multiple processor cores in the sense of the processor units. At least one further one of the multiple processor units may then also be individually connected via an interface to the data connection, and thus may independently form a master, for example as in the case of a GPU.

Moreover, for example, based on initially determined indicators for the usage of the memory bandwidths, a present value of a usage of the memory bandwidth is determined by each processor unit, and if this present value exceeds the initial value, and if the processor is not used for a real-time calculation, the operation of the particular processor unit is stopped. The (individual) present values may then moreover also be used to determine the mean value of the use. This may thus be referred to as a supervision phase. An excessive usage or load of the memory bandwidth by a processor unit, which does not execute an (important) real-time application, may thus be prevented. After the adjustment of the values of the usable memory bandwidth, however, the relevant processor unit may be put back into operation.

The mentioned indicators—which may also be referred to as key bandwidth indicators—are used to calculate the usage of the jointly used memory or the memory bandwidth. The precise method for the calculation may be platform-specific. Thus, for example, modern processors offer detailed insights into the memory access statistics: the number of the read and/or write processes (reads/writes) or updates (refreshes), the number of the utilized memory cycles (busy cycles) in a certain interval, or the number of the row hits and/or row misses. For example, the number of the utilized memory cycles may be used as an indicator to determine the memory utilization—and thus the usage of the memory bandwidth—in a supervision interval.

In the supervision phase, the memory unit may be supervised in that the memory bandwidth usage is determined using, for example, memory profiling counters (for example, DRAM profiling counter). In most cases, hardware performance counters are used for processor cores to determine the actual bandwidth of each core to the memory. Within the scope of the provided process, for example, a hardware counter of other masters such as the GPUs (which disclose events such as memory accesses) are also supervised.

In the regulating phase, all masters (CPU cluster, GPU, DMA) of the system may be regulated based on the pieces of information collected in the supervision phase. This may take place, for example, in that on a first level the data connection is reconfigured regularly (or also upon occurrence of a certain event), to establish quality parameters (such as the number of the outstanding requirements or the rate regulation) for each master. On a second level, for example, the assigned budgets (thus the assigned values for the usage of the memory bandwidth) may then be dynamically adapted for each of the cores in the CPU cluster. It is also possible that a processor unit such as a core of a CPU is stopped if it exceeds the budget in multiple or also in every regulating interval (thus during the regulating phase).

In addition, it may be provided that the execution on the GPUs and other masters—in contrast to the CPU or the processor units of a CPU—is not directly interrupted. This may also be regulated directly on the connection level, for example, by restriction of the access to the data connection. The portion of the memory transactions which arrive in the memory from each master may be regulated at the data connection. Different possibilities may result depending on the different functions of the data connection and the provision of applications.

One metric for this purpose is, for example, a rate regulation, using which the maximum number of transactions may be configured which may be output by one of the masters (for example, CPU cluster or GPU) in a certain interval. The usage of the memory bandwidth by each master may be calculated from the data obtained in the supervision phase. The permissible transaction rate may be increased or decreased depending on whether the memory unit is underloaded or overloaded. It is to be noted that changes of the quality or QoS parameters may also be carried out dynamically due to other events. Thus, for example, the transaction rate to the CPU cluster may be increased if the responsiveness of CPU tasks is low due to blocked cycles and memory conflicts. Another example is that a scheduler indicates that noncritical tasks are provided during a regulating phase on the GPU and the transaction rate of the GPU master may be reduced accordingly.

Many types of data connections (predominantly typical system buses) view the entire CPU cluster as one master. In addition to assigning a budget or value of the usage of the memory bandwidth to the entire CPU cluster—thus a processor unit group which is connected via a shared interface—an additional mechanism may therefore be provided to assign budgets to the cores within a CPU cluster—thus the individual processor units of the processor unit group—and regulate them.

If the usage by a core during a supervision interval exceeds the assigned budget, the particular core may be stopped as already mentioned above. Otherwise it is continued to be executed. This attempts to maintain the average usage of the memory bandwidth by each core within a certain range (as mentioned, for example, including lower and upper limiting value). If the mean value of the usage falls below the lower limiting value, this means that the cores may be assigned more memory bandwidth. The budget is therefore also increased for those cores or processor units which are not used for real-time calculations. In contrast, if the mean value of the usage increases above the upper limiting value, the budget of such cores or processor units is reduced to reduce the memory bandwidth. The budget of processor units which are used for real-time calculations is preferably kept at standard values or the initial values. This increase or reduction of the budget may be calculated using various algorithms. For example, the budget for each processor unit may take place by uniformly allocating the entire available budget to the number of the processor units (only processor units which are not used for real-time calculations are then taken into consideration here). The average usage of the memory bandwidth is calculated, as already mentioned, for example, based on the usage which was observed during the supervision phase.

The provided method is to be described in more detail hereinafter on the core level, i.e., on the level of processor units of a processor unit group such as a CPU cluster. In this case, as mentioned above, individual cores are classified as real-time or non-real-time cores. This process may also be implemented, however, to ensure finer regulation on a task level or thread level if tasks having mixed criticality are executed on the same core. A finer regulation is typically also accompanied by a higher overhead and additional demands on the platform. If the memory usage is measured for all masters on the memory controller, additional pieces of information, for example, the thread ID, are necessary. If the usage is measured by the masters on the master components themselves, the measurement of the tasks or threads is to be carried out individually, for example, with the aid of hardware performance indicators of the cores.

The described process (i.e., the dynamic regulation) may be implemented, for example, in the operating system, in a hypervisor (if partitions are to be regulated), in the middleware, or in a separate hardware unit or processing unit. The provided method is general in principle and may be implemented in any case if all functions or a subset of functions are available on the affected hardware platform. The condition is that a metric such as the memory utilization or the number of the blocked cycles or a relevant system metric is determinable which is derived either from the hardware performance indicators of the memory controller or from the slave port of the connection. For example, the DRAM metric is to be described as a key metric to determine or regulate the memory bandwidth.

Several possibilities are to be described hereinafter, in which the provided method may be implemented if the memory usage is used as a metric (for example, DRAM usage). Only the basic principle of the provided method is hereby to be explained. It is to be noted that modern processors offer a fundamental assistance for the power supervision on the core level. The memory unit, thus the jointly used memory, is to be viewed as a slave, in contrast, the units or processor units which access the memory, such as CPUs, GPUs, or DMA, are to be viewed as masters. The concept of the data connection is also to be understood in particular as a shared channel, in which data are transferred between the masters (CPUs, GPUs, etc.) to the memory (for example, DRAM). If multiple cores having a single port (interface) for the data connection are located in one cluster, the data connection typically views the entire cluster as a single master, as already mentioned.

For this purpose, a performance counter required by combinatorics is to be explained as an example hereinafter in platforms, using which the provided method may be implemented.

If the platform includes performance supervision units on the memory controller, using which the statistics of the memory usage of each individual unit may be ascertained to calculate the memory usage in a certain time interval, this permits a memory utilization determination individually by unit for processor cores of a CPU (and also for GPU, DMA, etc.). A metric for the assignment of the memory bandwidths may be derived directly therefrom.

If the platform includes performance supervision units on the memory controller, using which the statistics of the memory utilization of each master may be ascertained to calculate the memory usage in a certain time interval, this permits a memory utilization determination only per master (such as CPU, GPU, DMA, etc.). Each master is connected to a master port here. The memory controller may not differentiate between individual cores, but only between masters (clusters and other master components, for example, GPU). A metric for the assignment of the memory bandwidths may be derived from the master memory utilization using hardware performance counters to ascertain events per core. The statistics of the memory utilization of each master may also be ascertained, of course, from the statistics of the memory utilization of each individual unit (cf. prior paragraph). In this case it is important, for example, that the performance counters are required for each core to calculate the required metric for each core using the statistics of each master. This is an alternative implementation if the DRAM statistic per individual unit is not available.

If the platform includes performance monitoring units on the memory controller, using which the statistics of the memory utilization may only be ascertained as a whole to calculate the memory utilization in a certain time interval, this only permits a memory utilization determination as a whole. A metric for the assignment of the memory bandwidths may be derived from the overall memory utilization using hardware performance counters to ascertain events per core. The statistics of the memory utilization as a whole may also, of course, be ascertained from the statistics of the memory utilization per master (cf. prior paragraph) or from the statistics of the memory utilization of each individual unit (cf. paragraph before prior paragraph). If these two values (overall utilization and core-specific events) may thus be read out in the platform, the method may be applied for cores, since the metric may be calculated from the two values.

In the method according to the present invention, the functions of the QoS connection may be used to further regulate the data traffic between different masters. Two cases may be differentiated:

The platform may offer the option of regulating the data traffic on the data connection per master level (core cluster, GPU, DMA, etc.). For this purpose, the maximum memory which a cluster may use with the aid of the hardware-assisted regulation is initially defined, which may then be combined with the software mechanism of the operating system which uses the hardware performance counter per core to regulate each core.

The option for regulating the data traffic on the data connection per level of individual units (individual core in the cluster, in the GPU, in the DMA, etc.) may also be offered. No additional counters are required on the core level, since the data traffic may be regulated directly on the connection level.

In general, the usage of the memory bandwidth may be measured either on the slave side, for example, at the memory controller or the slave port of the data connection. If a measurement is not possible, it may be calculated based on additional hardware performance counters on the master side of the data connection. If the master is connected, for example, to an individual master port, measurements may be carried out within a CPU cluster with the aid of the individual core counters or at the master ports of a data connection.

In this scenario, the relationship between the memory accesses and the usage of the memory bandwidth or memory utilization is relevant. A simple but only approximate possibility for deriving the usage of the memory bandwidth is, for example, to formulate a simple correlation between the memory access and the resulting usage of the memory bandwidth. A more accurate path takes into consideration, for example, more factors such as the memory access pattern and the request organization mechanisms in the memory controller.

If there is no possibility for measuring the required metrics such as the memory utilization for one of the masters, a fixed utilization amount may be reserved for each master. In this case, however, these masters may only be statically controlled and a dynamic regulation is not possible. Most modern processors have hardware performance counters, however, to track fundamental events such as memory accesses, and a form of dynamic regulation is possible.

In summary, a type of dynamic regulation is thus provided with the provided method, which uses profiling mechanisms of jointly used resources outside a processing cluster such as the memory controller and the QoS modules on the data connection to dynamically assign budgets for jointly used memory resources.

A regulation of the memory bandwidth is thus not restricted to processor cores, and there is also the possibility of supervising or dynamically regulating the memory bandwidth with respect to other masters (for example, GPUs). In addition, the provided approach is not only based on the hardware performance counters in the processor cores to regulate the memory bandwidth, but rather the actual memory utilization is also taken into consideration.

In addition to the existing mechanisms, the provided dynamic regulation increases the efficient memory utilization while the guarantees for real-time cores (thus processor units which are used for real time) are maintained by applications for a certain memory bandwidth. In general, the memory bandwidth used is not a fixed value, rather it is dependent on the present workload and the access patterns to the memory from all accessing sources of the system. For example, the bandwidth differs if random or sequential accesses take place. In previous approaches, a fixed static value for a regulating interval is used independently of the changing workload. This means that the value is generally set very pessimistically and therefore the memory bandwidth may not be used efficiently. This is improved using the provided method.

In addition, dynamic time intervals may also be used, i.e., the time intervals during which the supervision and regulating phases take place may be varied in their length. For example, non-preemptive planning (so-called scheduling or operating system scheduling or task scheduling) may take place based on the real-time task or based on the reconfiguration of QoS. The memory usage may also take place based on the number of the utilized memory cycles (busy cycles)

and the number of outstanding transactions in the memory buffer in the specified time interval.

A processing unit according to an example embodiment of the present invention, for example, a control unit of a motor vehicle or an industrial controller, is configured, in particular by programming, to carry out a method according to the present invention.

The implementation of a method according to an example embodiment of the present invention in the form of a computer program or a computer program product including program code for carrying out all method steps is also advantageous, since this incurs particularly low costs, in particular if an executing control unit is also used for further tasks and is therefore present in any case. Suitable data media for providing the computer program are in particular magnetic, optical, and electrical memories, e.g., hard drives, flash memories, EEPROMs, DVDs, etc. A download of a program via computer networks (Internet, intranet, etc.) is also possible.

Further advantages and embodiments of the present invention result from the description and the figures.

The present invention is schematically shown on the basis of an exemplary embodiment in the figures and is described hereinafter with reference to the figures.

DETAILED DESCRIPTION OF EXAMPLE EMBODIMENTS

Figure 1:
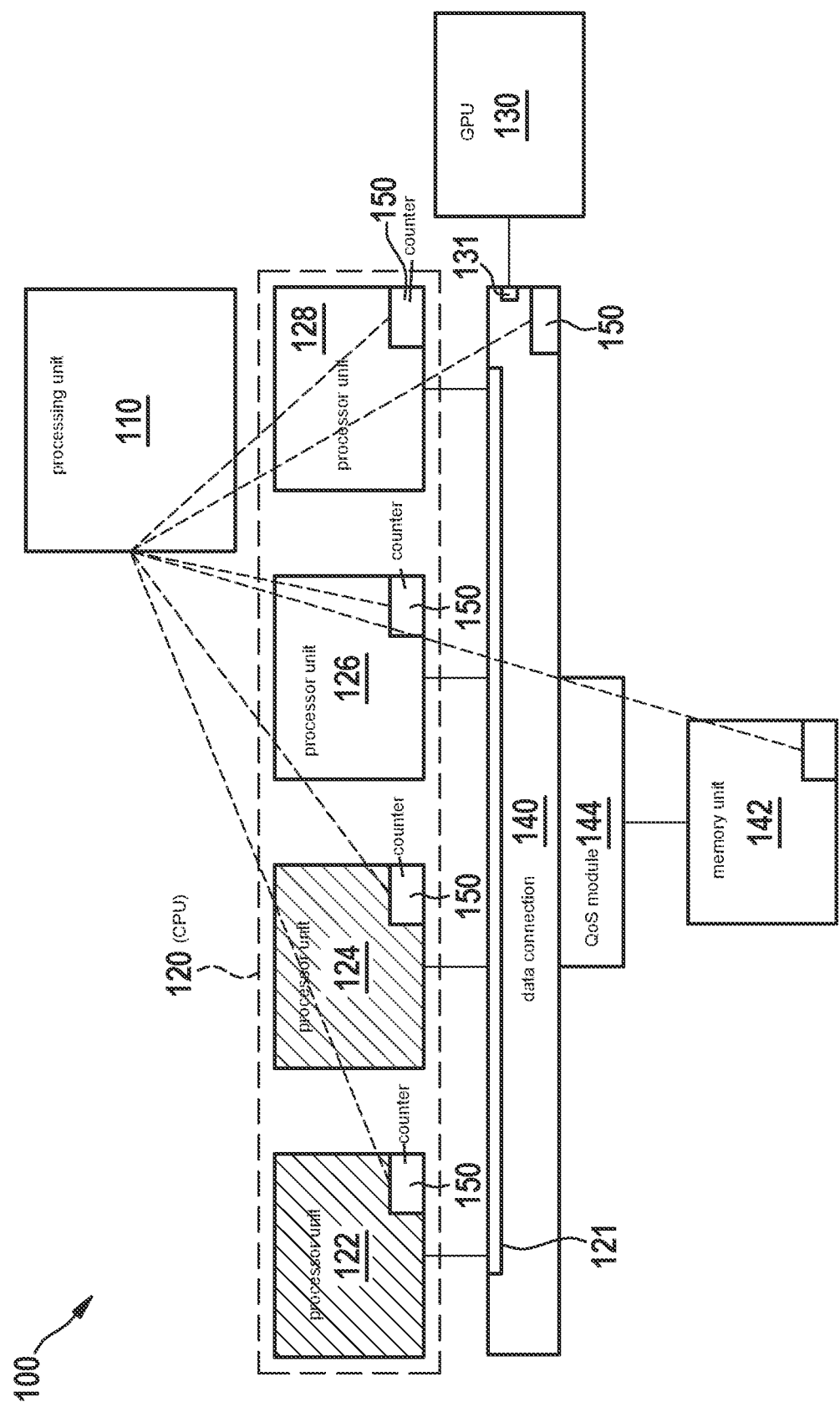
FIG. 1 schematically shows a system including processor units and memory units in which a method according to an example embodiment of the present invention may be carried out.

FIG. 1 schematically shows a system in which a method according to the present invention may be carried out. System 100 includes processor units 122, 124, 126, 128, and 130, which are connected to a data connection 140, for example, a data bus. System 100 also includes a memory unit 142, for example, a DRAM, as a working memory, which is also connected to data connection 140. In this way, the processor units have access to the memory unit and may write data therein and read data therefrom. Memory unit 142 may also include a memory controller, which is used for activating the memory unit, moreover a QoS module 144 is provided. QoS module 144 is seated, for example, in the interconnect (partially also distributed to the masters) and not directly on the memory controller.

Processor units 122, 124, 126, and 128 together form a processor unit group 120 or are part of such a group. For example, processor unit group 120 may be a CPU (multicore CPU) or a CPU cluster, in which processor units 122, 124, 126, and 128 are processor cores. For example, processor units 122, 124 are to be provided or used for real-time calculations (so-called RTC), but not processor units 126, 128. Processor units 130 may be a GPU, for example. GPU 130 is also connected to data connection 140 via an interface 131, and CPU 120 is connected via an interface 121 shared by processor cores 122, 124, 126, 128. As already mentioned at the outset, GPU 130 may be used as a master, as may CPU 120 as a whole.

Furthermore, a processing unit 110 is shown as an example, on which a method according to the present invention is executed or implemented. As already mentioned, this may be a special processing unit, but the method—also referred to as a dynamic regulator—may also be implemented in an operating system or a hypervisor.

Furthermore, a hardware performance counter 150 is provided in each of processor units 122, 124, 126, 128, and 130 and in data connection 140 and memory unit 142, with the aid of which, for example, write and read accesses—typically also individually per source—are counted. Data acquired for this purpose may be transferred to processing unit 110 or read thereby.

Figure 2:
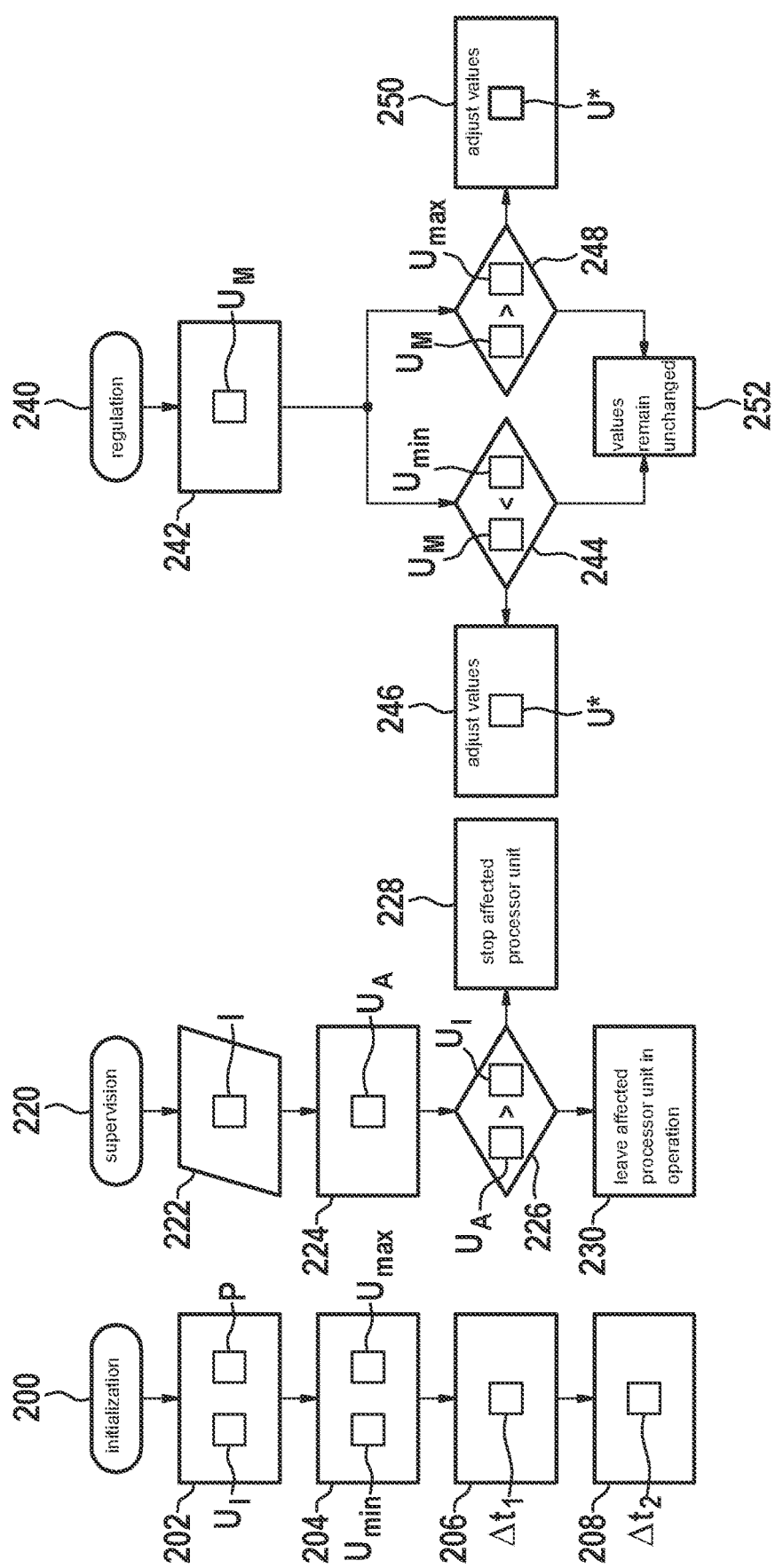
FIG. 2 schematically shows a sequence of a method according to the present invention in one preferred specific embodiment.

FIG. 2 schematically shows a sequence of a method according to the present invention in one preferred specific embodiment. For this purpose, first an initialization phase 200 is shown, in which, in a step 202, an initial value $U_I$ of a usable memory bandwidth is determined and then assigned for each of the multiple or all processor units, for example, as shown in FIG. 1. By way of example, only one initial value $U_I$ is shown. In addition, various quality parameters P, for example, a number of the outstanding requirements, may be predefined.

In a step 204, a lower limiting value $U_{min}$ and an upper limiting value $U_{max}$ are then determined for a mean usage of the memory bandwidth, which together form a range for the mean usage of the memory bandwidth. In a step 206, a duration $\Delta t_1$ for subsequent supervision phases may be determined and in a step 208, a duration $\Delta t_2$ for subsequent regulating phases may be determined.

After the end of initialization phase 200, the operation of the system may take place in a regular way and checks and possibly changes of assigned memory bandwidths take place repeatedly. As already mentioned, this may take place by way of alternating supervision phases 220 and regulating phases 240.

In a supervision phase 220, in a step 222, initially indicators I or values thereof are detected, on the basis of which, in a step 224, a present value $U_A$ of the usage of the memory bandwidth is calculated, specifically individually for each processor unit. It is possible that this only takes place for non-real-time processor units. Nonetheless, however, these may also be incorporated. This may be of interest, for example, if they are soft real-time processor units and a minimal quality of the non-real-time cores does not necessarily have to be or should not be maintained. For example, the number of the read and/or write processes, which the individual processor units carry out on the memory unit, comes into consideration as indicators I. Counters 150 shown in FIG. 1 may be used for this purpose.

In a step 226, it is checked whether present value $U_A$ is greater than initial value $U_I$ for the (assigned) usage of the memory bandwidth. If this is so, the affected processor unit is stopped in step 228, otherwise it is still left in operation according to step 230. It is ensured in this way that the memory bandwidth, as intended, is no longer utilized. However, this also applies in particular only for processor units which do not have to carry out real-time calculations. Carrying out real-time calculations thus remains ensured. However, as already mentioned, soft real-time processor units may possibly be taken into consideration here, which possibly do not have to be operated further.

In subsequent regulating phase 240, a mean or average value $U_M$ is ascertained in a step 242. Individual values $U_A$ from step 224 may be used for this purpose, for example. The arithmetic mean value may be formed for this purpose, for example. It is then checked whether present mean value $U_M$ is outside the permissible range.

For this purpose, in step 244, initially a comparison to lower limiting value $U_{min}$ is carried out. If present mean value $U_M$ is less than $U_{min}$, in step 246, the values for the processor units (if this is the first adjustment, these are the initial values) may be increased, thus each adjusted to new values U*.

If this does not apply, in step 248, a comparison to upper limiting value $U_{max}$ is carried out. If present mean value $U_M$ is greater than $U_{max}$, in step 250, the values for the processor units (if this is the first adjustment, these are the initial values) may be reduced, thus each adjusted to new values U*.

If this also does not apply, the values thus remain unchanged according to step 252. The adjustment of the values may take place similarly as in the initialization phase during the determination of the initial values, however, an adjustment by a predefined amount or also an amount dependent on a difference of the mean value from lower or upper limiting value is also possible.

The supervision phase may subsequently begin again. However, it is also possible to wait a certain duration until it is carried out again. In this way, the individual memory bandwidths for the processors are dynamically adjusted and the entire memory bandwidth is efficiently utilized.

What is claimed is:

1. A method for dynamically assigning memory bandwidth to multiple processor units which are connected via a data connection to a shared memory unit, the method comprising the following steps:
    in an initialization phase, assigning a respective initial value of a usable memory bandwidth to each of the multiple processor units and determining a permissible range for a mean usage of the memory bandwidth for each of the multiple processing units;
    subsequent to the initialization phase, for each of the multiple processor units, determining a present value of the mean usage of the memory bandwidth, and, for at least some of the multiple processor units, in response to the present value being outside the permissible range, adjusting the respective values of the usable memory bandwidth.

2. The method as recited in claim 1, wherein at least two of the multiple processor units are part of a processor unit group and are connected via a shared interface to the data connection.

3. The method as recited in claim 2, wherein at least one further one of the multiple processor units is individually connected via an interface to the data connection.

4. The method as recited in claim 1, further comprising:
    determining, within the scope of checking the memory bandwidths, the present value of a usage of the memory bandwidth by each of the processor units, and, when the present value of the usage of the memory bandwidth by a processor unit of the processor units exceeds the respective initial value and the processor unit is not used for a real-time calculation, stopping operation of the processor unit.

5. The method as recited in claim 4, further comprising:
    detecting one or multiple indicators for the usage of the memory bandwidth by each of the processor units and determining the present value of the usage of the memory bandwidth by each processor unit based on the one or multiple indicators.

6. The method as recited in claim 1, further comprising:
    adjusting, based om the present value of the mean usage of the memory bandwidth by the multiple processor units being outside the permissible range, adjusting the respective values of the memory bandwidth usable by processor units, which are not used for a real-time calculation, and maintaining the respective values of the memory bandwidth usable by processor units which are usable for a real-time calculation.

7. The method as recited in claim 1, further comprising, in the initialization phase, predefining at least one quality parameter for at least one of the multiple processor units and subsequently, based on the present value of the mean usage being outside the permissible range, adjusting the at least one quality parameter for the at least one of the multiple processor units.

8. The method as recited in claim 1, further comprising, in the initialization phase, assigning in each case a maximum required value including an initial buffer, as the initial value of the usable memory bandwidth to those of the processor units which are used for a real-time calculation.

9. The method as recited in claim 1, further comprising, in the initialization phase, assigning in each case a mean required value as the initial value of the usable memory bandwidth to those of the processor units which are not used for a real-time calculation.

10. A processing unit configured to dynamically assigning memory bandwidth to multiple processor units which are connected via a data connection to a shared memory unit, the processing unit configured to:
    in an initialization phase, assign a respective initial value of a usable memory bandwidth to each of the multiple processor units and determine a permissible range for a mean usage of the memory bandwidth for each of the multiple processing units;
    subsequent to the initialization phase, for each of the multiple processor units, determining a present value of the mean usage of the memory bandwidth, and, for at least some of the multiple processor units, in response to the present value being outside the permissible range, adjusting the respective values of the usable memory bandwidth.

11. A non-transitory machine-readable memory medium on which is stored a computer program for dynamically assigning memory bandwidth to multiple processor units which are connected via a data connection to a shared memory unit, the computer program, when executed by a processing unit, causing the processing unit to perform the following steps:
    in an initialization phase, assigning a respective initial value of a usable memory bandwidth to each of the multiple processor units and determining a permissible range for a mean usage of the memory bandwidth for each of the multiple processing units;
    subsequent to the initialization phase, for each of the multiple processor units, determining a present value of the mean usage of the memory bandwidth, and, for at least some of the multiple processor units, in response to the present value being outside the permissible range, adjusting the respective values of the usable memory bandwidth.

* * * * *